(12) United States Patent
Kitamori et al.

(10) Patent No.: US 8,508,663 B2
(45) Date of Patent: Aug. 13, 2013

(54) ELECTRONIC DEVICE CAPABLE OF WIRED CONNECTION TO AN EXTERNAL DEVICE HAVING A POWER-SAVE MODE

(75) Inventors: Yutaka Kitamori, Osaka (JP); Takafumi Hayashi, Osaka (JP); Kiyoshi Kobayashi, Osaka (JP); Takahiro Shigetomi, Osaka (JP)

(73) Assignee: SANYO Electric Co., Ltd., Moriguchi-Shi (JP)

( * ) Notice: Subject to any disclaimer, the term of this patent is extended or adjusted under 35 U.S.C. 154(b) by 872 days.

(21) Appl. No.: 12/491,300

(22) Filed: Jun. 25, 2009

(65) Prior Publication Data

US 2009/0322944 A1 Dec. 31, 2009

(30) Foreign Application Priority Data

Jun. 25, 2008 (JP) ................................. 2008-165284

(51) Int. Cl.
*H04N 5/46* (2006.01)
*H04N 3/27* (2006.01)

(52) U.S. Cl.
USPC ............ 348/552; 348/553; 348/730; 713/324

(58) Field of Classification Search
USPC ................. 348/552, 553, 730, 554; 713/320, 713/324; 725/118; 710/14
See application file for complete search history.

(56) References Cited

U.S. PATENT DOCUMENTS

| 7,562,242 | B2 * | 7/2009 | Hori ............................... 713/324 |
| 2008/0074411 | A1 | 3/2008 | Yamashita | |
| 2008/0320539 | A1 * | 12/2008 | Ohkita ........................... 725/118 |
| 2009/0051824 | A1 | 2/2009 | Satou | |

FOREIGN PATENT DOCUMENTS

| CN | 101150690 A | 3/2008 |
| JP | 2004186919 A | 7/2004 |
| JP | 2008034907 A | 2/2008 |
| JP | 2009100329 A | 5/2009 |
| WO | 2008/069304 A1 | 6/2008 |

OTHER PUBLICATIONS

Chinese Office Action issued Oct. 12, 2012 in corresponding Chinese application No. 200910150883.3.
Japanese Office Action issued Sep. 4, 2012 in corresponding Japanese application No. 2008-165284.
English Abstract for JP 2009-100329 A, published May 7, 2009.
English Abstract for JP 2008-034907 A, published Feb. 14, 2008.

\* cited by examiner

*Primary Examiner* — Jefferey Harold
*Assistant Examiner* — Jean W Desir
(74) *Attorney, Agent, or Firm* — NDQ&M Watchstone LLP

(57) ABSTRACT

An electronic device has a plurality of wired-connection terminals, a selection portion that selects one of the plurality of wired-connection terminals for input of source data, and a transmission portion that wiredly transmits a command requesting a shift to a normal-operation mode to another electronic device having a power-save mode after switching of input by selection by the selection portion. The plurality of wired-connection terminals are all of an identical type for wired connection to another electronic device having a power-save mode.

4 Claims, 6 Drawing Sheets

# ELECTRONIC DEVICE CAPABLE OF WIRED CONNECTION TO AN EXTERNAL DEVICE HAVING A POWER-SAVE MODE

This nonprovisional application claims priority under 35 U.S.C. §119(a) on Patent Application No. 2008-165284 filed in Japan on Jun. 25, 2008, the entire contents of which are hereby incorporated by reference.

BACKGROUND OF THE INVENTION

1. Field of the Invention

The present invention relates to an electronic device capable of wired connection to an electronic device having a power-save mode.

2. Description of Related Art

A digital interface for digital AV (audiovisual) devices, HDMI (High-Definition Multimedia Interface) allows high-speed transfer of data such as of video and audio across a single cable. Modern digital AV devices, such as flat televisions and DVD recorders, are increasingly equipped with HDMI terminals as a standard feature.

Connection between digital AV devices having HDMI terminals is achieved via an HDMI cable, which includes a first to a fifth signal line described below.

The first signal line is a TMDS data signal line for one-way transfer—from source device to sink device—of audio and/or video data (hereinafter referred to as AV data) and infoframes (information on the format of AV data etc.) in a TMDS (Transmission Minimized Differential Signaling) format.

The second signal line is an HPD (Hot Plug Detect) signal line mainly used for indicating the timing of the start of transmission of AV data from source device to sink device.

The third signal line is a DDC (Display Data Channel) signal line used for transferring sink device-specific information (vendor name, model number, permitted resolutions, HDMI terminal numbers, etc.) to the source device. The DDC signal line is also used for authentication conforming to HDCP (High-bandwidth Digital Content Protection). When the HDMI cable is connected to the HDMI terminal of the sink device, the DDC signal line is connected to an NVRAM (non-volatile RAM) inside the sink device.

The fourth signal line is a CEC signal line used to achieve CEC (Consumer Electronics Control).

CEC is a capability that enables two-way control between source device and sink device, and is defined, along with AV data output specifications, in the HDMI standard. Nowadays, many CEC-ready electronic devices are commercially available. Since CEC allows two-way exchange of commands between source device and sink device, it permits both one-to-one and one-to-many control of devices.

The CEC standard defines a variety of functions. For example, with the function "One Touch Play," when the "Play" button is pressed on the source device (e.g., a DVD recorder), the sink device (for example, a digital television) automatically shifts from stand-by mode, in which it remains in a power-saving, idle state, to power-on mode, in which a normal operation state is maintained, and selects as "input" the HDMI terminal connected via the HDMI cable to the source device. The CEC standard defines many other functions, and which functions to implement in products is up to manufacturers.

The fifth line is a DDC 5V signal line for supplying 5 V electric power from source device to sink device. The hardware configuration here is such that, after the sink device starts to be supplied with 5 V electric power via the fifth signal line from the source device, the sink device outputs a 5V HPD signal to an HPD pin of the HDMI terminal.

One way of using HDMI is to connect together, via an HDMI cable, a video camera having a power-save mode as a source device and a digital television as a sink device.

Generally, compared with stationary devices such as VCRs and DVD recorders, mobile devices such as video cameras and digital still cameras are designed with more emphasis placed on utmost reduction of electric power consumption. Accordingly, many mobile devices such as video cameras and digital still cameras are so configured that, if no user operation is detected for a predetermined period, they shift from power-on mode, in which they remain in a normally operating state, to power-save mode, in which they remain in a power-saving, idle state.

Typically, a video camera in power-save mode can be brought to normal operation mode by the user pressing the power switch or another key of the video camera, or operating the remote control dedicated to it. Instead, a CEC command requesting a shift to power-on mode (hereinafter referred to as a power-on request command) may be transmitted from the digital television to the digital video camera; this too brings the digital video camera in power-save mode to normal operation mode. At this time, however, depending on the state of the "input" currently being selected, the HPD signal may drop to low level. If the HPD signal drops to low level, the digital video camera may unexpectedly shift to power-save mode.

Likewise, when a power-on request command is transmitted from the digital video camera to the digital television, if switching of "input" occurs on the part of the digital television, the HPD signal may drop to low level. If the HPD signal drops to low level, the digital video camera may unexpectedly shift to power-save mode.

SUMMARY OF THE INVENTION

An object of the present invention is to provide an electronic device that prevents a situation where, due to its own control, another electronic device to which it is wiredly connected unexpectedly remains in power-save mode.

To achieve the above object, according to the invention, an electronic device comprises: a plurality of wired-connection terminals; a selection portion that selects one of the plurality of wired-connection terminals for input of source data; and a transmission portion that wiredly transmits a command requesting a shift to a normal-operation mode to another electronic device having a power-save mode after switching of input by selection by the selection portion. Here, the plurality of wired-connection terminals are all of an identical type for wired connection to another electronic device having a power-save mode.

DETAILED DESCRIPTION OF PREFERRED EMBODIMENTS

Embodiments of the present invention will be described below with reference to the accompanying drawings. The following description deals with a digital television as an example of an electronic device according to the invention.

Figure 1:
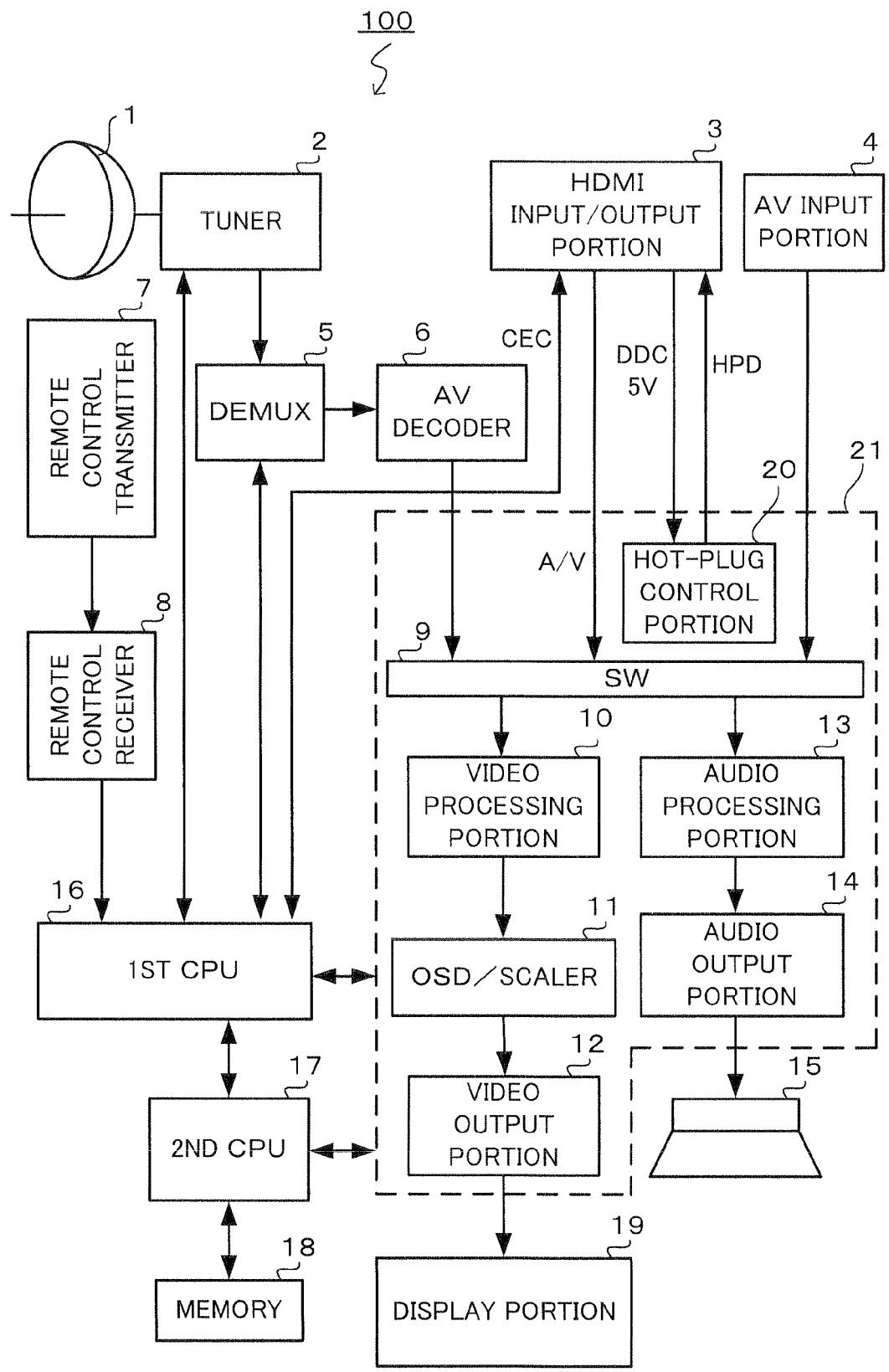
FIG. 1 is a diagram showing an outlined configuration of a digital television embodying the invention.

An outlined configuration of a digital television embodying the invention is shown in FIG. 1. The digital television 100 embodying the invention comprises a tuner 2, an HDMI input portion 3, an AV input portion 4, a DEMUX (demultiplexer) 5, an AV decoder 6, a remote control receiver 8, a switch (SW) 9, a video processing portion 10, an OSD/scaler 11, a video output portion 12, an audio processing portion 13, an audio output portion 14, a loudspeaker 15, a first CPU 16, a second CPU 17, a memory 18, a display portion 19, and a hot-plug control portion 20.

An antenna 1 is installed outdoors; it receives a digital broadcast wave, and outputs a high-frequency digital modulated signal to the tuner 2.

The tuner 2 selects a physical channel in accordance with a channel select signal from the first CPU 16. Through this channel selection process, the tuner 2 coverts the high-frequency digital modulated signal into a signal of a particular frequency. The tuner 2 also decodes the selected digital modulated signal to generate a transport stream, and outputs the generated transport stream to the DEMUX 5.

The DEMUX 5 separates the transport stream received from the tuner 2 into a video stream and an audio stream of MPEG2 (Moving Picture Experts Group 2), PSI/SI (Program-Specific Information/Service Information), etc.

The AV decoder 6 comprises a video decoder (unillustrated) that decodes the video stream and an audio decoder (unillustrated) that decodes the audio stream, and outputs the decoded video/audio information to the switch 9.

The HDMI input portion 3 has three HDMI terminals (unillustrated in FIG. 1), to each of which an HDMI cable can be connected. Audio/video information inputted from an external device via the TMDS data signal line of a HDMI cable to the HDMI input portion 3 is inputted to the switch 9. The CEC pins of the three HDMI terminals are connected together and connected to the first CPU 16; thus, CEC commands inputted from an external device (source device) via the CEC signal line of an HDMI cable to the HDMI input portion 3 are inputted to the first CPU 16. On the other hand, CEC commands outputted from the first CPU 16 to the HDMI input portion 3 are inputted via the CEC signal line of the HDMI cable to the external device (source device). In addition, 5 V electric power is supplied from an external device (source device) via the DDC5V signal line of an HDMI cable and via the HDMI input portion 3 to the hot-plug control portion 20. NVRAMs (unillustrated) are provided one for each of the HDMI terminals; whichever of these NVRAMs corresponds to an HDMI terminal to which an HDMI cable is connected is supplied with 5 V electric power from an external device (source device) via the DDC5V signal line of the HDMI cable and via the HDMI input portion 3. The hot-plug control portion 20 outputs a low- or high-level control signal to the HDMI input portion 3 thereby to indicate the timing of the start of transmission of AV data from source device to sink device.

The AV input portion 4 has an S terminal, a D terminal, and an RCA terminal, of which none is illustrated. Audio/video information inputted from an external device via an S-, D-, or RCA-terminal cable to the AV input portion 4 is outputted to the switch 9.

The switch 9 is a switch for switching among the video/audio inputs from the AV decoder 6, the HDMI input portion 3, and the AV input portion 4. The video processing portion 10 performs digital video processing on the video information inputted via the switch 9. The OSD/scaler 11 is a circuit that generates video data based on character information and color information specified from the second CPU 17, and performs reduction processing on received broadcast video. The OSD/scaler 11 achieves display of an EPG (electronic program guide) based on broadcast program information, display of data broadcast, display of menu screens, etc. The video output portion 12 converts the video information inputted from the OSD/scaler 11 into a format of an input signal to the display portion 19. The display portion 19 displays video based on the video signal inputted from the video output portion 12.

The audio processing portion 13 receives audio information via the switch 9, performs D/A conversion on it, and outputs the resulting analog audio signal to the audio output portion 14. The audio output portion 14 amplifies and otherwise processes the audio signal inputted to it, and outputs the result to the loudspeaker 15. The loudspeaker 15 reproduces sounds based on the audio signal inputted from the audio output portion 14.

A remote control transmitter 7 is a transmitter for transmitting instructions to the digital television 100 embodying the invention. When a key provided on the remote control transmitter 7 is operated, a remote control signal corresponding to the key is transmitted from a light-emitting portion of the remote control transmitter 7. The remote control receiver 8 receives the control signal, converts it into an electrical signal, and feeds it to the first CPU 16.

The first CPU 16 mainly performs processing on remote control signals from the remote control transmitter 7 and on signals resulting from keys on an unillustrated operation portion being operated, and also controls the tuner 2 etc. Even when the power is turned off (power-save mode is invoked) by the remote control transmitter 7, the first CPU remains supplied with electric power and keeps operating to perform processing such as for monitoring remote control signals. On the other hand, the second CPU 17 mainly controls the OSD/scaler 11, the video processing portion 10, the display portion 19, etc. The first CPU 16 and the second CPU 17 are so configured that they can communicate with each other so that, under the control of the first CPU 16, the second CPU 17 and the individual blocks in a video/audio processing portion 21 can be stopped and started. The memory 18 stores control programs and various kinds of data.

Figure 2:
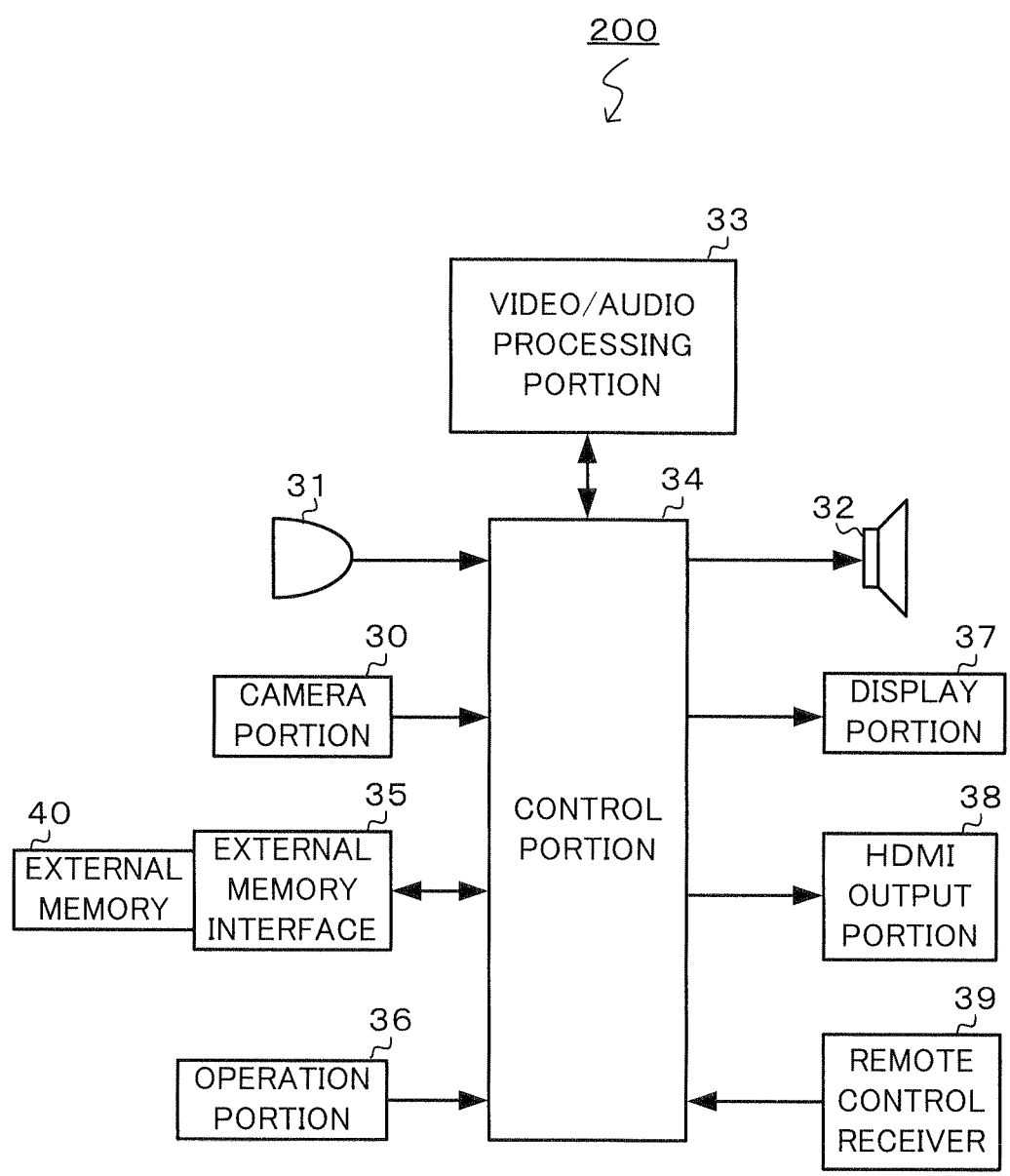
FIG. 2 is a diagram showing an outlined configuration of an example of a digital video camera capable of HDMI connection to a digital television embodying the invention.

Next, an outlined configuration of an example of a digital video camera capable of HDMI connection (wired connection using an HDMI cable) to a digital television embodying the invention is shown in FIG. 2. The digital video camera 200 capable of HDMI connection to the digital television 100 embodying the invention comprises a camera portion 30, a microphone 31, a loudspeaker 32, a video/audio processing portion 33, a control portion 34, an external memory interface 35, an operation portion 36, a display portion 37, an HDMI output portion 38, and a remote control receiver 39.

The control portion 34 performs various kinds of processing such as for controlling the operation of the individual blocks within the digital video camera, for controlling the supply of electric power to the individual blocks within the digital video camera, and for CEC communication with an external device via the HDMI output portion 38. The control portion 34 thus controls the entire digital video camera.

Through the processing such as for controlling the operation of the individual blocks within the digital video camera and for controlling the supply of electric power to the individual blocks within the digital video camera, the control portion 34 also switches between power-on mode, in which a normal operation state is maintained, and power-save mode, in which a power-saving, stand-by state is maintained. The control portion 34 effects a shift from power-on mode to power-save mode according to either or both of the rules (1) and (2) noted below. In the embodiment under discussion, it is assumed that all that is performed in power-save mode are the monitoring of presence or absence of operation on a power switch on the operation portion 36 or on the remote control transmitter dedicated to the digital video camera, and minimal processing for CEC communication.

Rule (1): Shift from power-on mode to power-save mode if no user operation is detected for a predetermined period or longer.

Rule (2): Shift from power-on mode to power-save mode if an HPD signal transferred from a sink device via the HPD signal line of a HDMI cable remains at low level (equal to the ground potential level) for a predetermined period or longer.

During movie shooting, video information resulting from shooting by the camera portion 30 and audio information resulting from sound collection by the microphone 31 is individually subjected to compression processing by the video/audio processing portion 33, and is, via the external memory interface 35, recorded to an external memory 40.

During movie playback, the digital video camera 200 operates differently depending on whether or not it is HDMI-connected to an external device (sink device). In a case where the digital video camera 200 is not HDMI-connected to an external device (sink device), video and audio information read out from the external memory 40 is individually subjected to decompression processing by the video/audio processing portion 33, so that a movie is displayed on the display portion 37 and sounds are reproduced from the loudspeaker 32. By contrast, in a case where the digital video camera 200 is HDMI-connected to an external device (sink device), video and audio information read out from the external memory 40 is individually subjected to decompression processing by the video/audio processing portion 33, and the result is transferred, in a TMDS format, from the HDMI output portion 38 to the external device (sink device).

Figure 3:
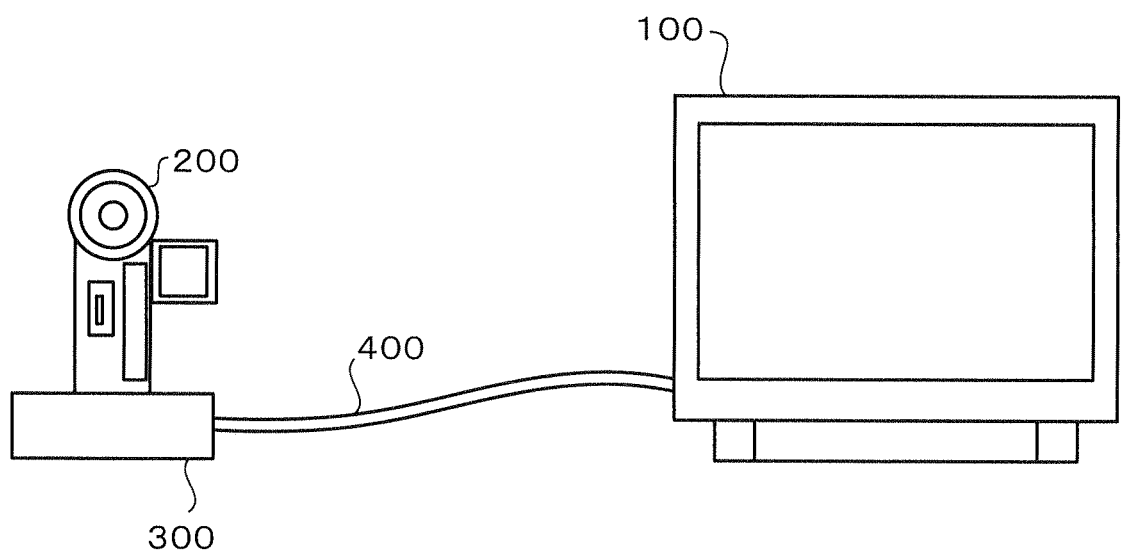
FIG. 3 is a diagram showing how a digital video camera and a digital television embodying the invention are HDMI-connected together.

Next, how the digital video camera 200 and the digital television 100 embodying the invention are HDMI-connected together is shown in FIG. 3. The digital television 100 embodying the invention is connected to the digital video camera 200 by an HDMI cable 400 via a power supply cradle 300.

One end of the HDMI cable 400 is connected to one of the three HDMI terminals provided in the digital television 100 embodying the invention. The other end of the HDMI cable 400 is connected to an HDMI terminal provided in the power supply cradle 300. When the digital video camera 200 is mounted on the power supply cradle 300, a connector of the digital video camera 200 is connected to a connector of the power supply cradle 300, so that the HDMI input portion 3 of the digital television 100 embodying the invention and the HDMI output portion 38 of the digital video camera 200 are connected together via the HDMI cable 400 and the power supply cradle 300.

Figure 4:
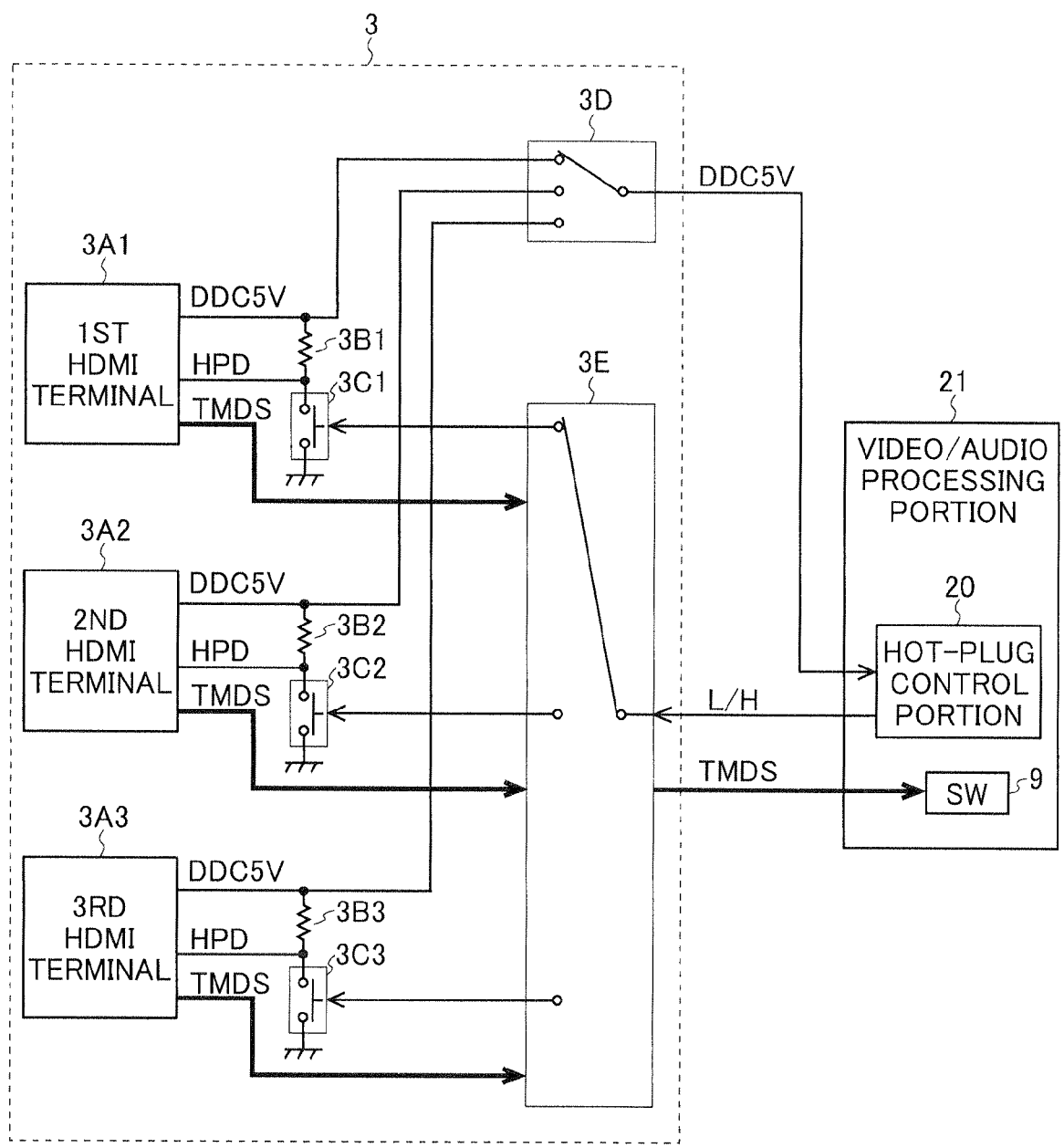
FIG. 4 is a diagram showing an example of the configuration of an HDMI input portion in a digital television embodying the invention.

Next, an example of the configuration of the HDMI input portion of the digital television 100 embodying the invention is shown in FIG. 4. As shown in FIG. 4, the HDMI input portion 3 has a first HDMI terminal 3A1, a second HDMI terminal 3A2, a third HDMI terminal 3A3, resistors 3B1 to 3B3, pull-down switches 3C1 to 3C3, a first "input" select switch 3D, and a second "input" select switch 3E. FIG. 4 omits illustration of portions related to DDC and CEC. The pull-down switches 3C1 to 3C3 are each a switch that is in an on state when a control signal fed to its control terminal is at low level and in an off state when the control signal is at high level.

A DDC5V pin (unillustrated) of the first HDMI terminal 3A1 is connected to a first contact of the first "input" select switch 3D by a DDC 5V line. An HPD pin (unillustrated) of the first HDMI terminal 3A1 is connected to the DDC 5V line via an HPD line and via the resistor 3B1. One end of the pull-down switch 3C1 is connected to the node between the HPD line and the resistor 3B1, and the other end of the pull-down switch 3C1 is connected to ground. To a control terminal of the pull-down switch 3C1 is supplied a control signal from a first contact of the second "input" select switch 3E.

The same description applies to the second HDMI terminal 3A2 and the third HDMI terminal 3A3 except that they are connected to different contacts of the first and second "input" select switches 3D and 3E, and therefore no overlapping description will be repeated.

The hot-plug control portion 20 within the video/audio processing portion 21, on one hand, outputs a low- or high-level control signal to a pole of the second "input" select switch 3E and, on the other hand, receives a DDC5V signal when it is fed from a pole of the first "input" select switch 3D.

A TMDS pin (unillustrated) of the first HDMI terminal 3A1, a TMDS pin (unillustrated) of the second HDMI terminal 3A2, and a TMDS pin (unillustrated) of the third HDMI terminal 3A3 are connected by TMDS lines, which are connected together within the second "input" select switch 3E, to the switch 9 within the video/audio processing portion 21.

Normally, when a digital television having an HDMI terminal shifts to power-on mode or switches inputs for instance, it so controls that, with a source device connected to it, the HPD signal shifts from low level to high level. The shift of the HPD signal from low level to high level serves to notify a source device of the timing of output of AV data in a TMDS format.

Normally, when a digital video camera is in power-save mode, the user shifts it to power-on mode by pressing the power switch or another key of the digital video camera.

The digital video camera 200 connected to the digital television 100 embodying the invention by the HDMI cable 400 is so configured that it can shift to power-on mode also in response to a power-on request command. CEC commands include universal commands that are common to different manufacturers and vendor commands that manufacturers can define for themselves, and a power-on request command can be realized as vendor command.

The digital television 100 embodying the invention prevents the digital video camera 200 connected to it by the HDMI cable 400 from unexpectedly remaining in power-save mode through the control described below.

Figure 5:
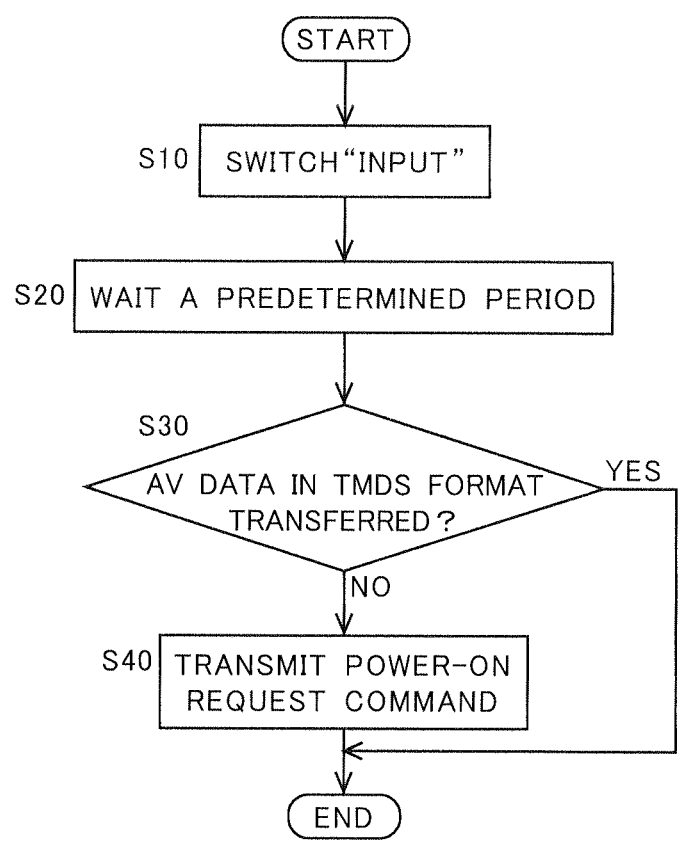
FIG. 5 is a flow chart showing the processing performed to switch "input" according to operation by a user in a digital television embodying the invention.

When a key assigned an "input" switching function on the remote control transmitter 7 or on the operation portion of the digital television 100 embodying the invention is pressed by the user, or when a key on the remote control transmitter 7 assigned a function dedicated to the digital video camera 200 is pressed by the user, the first CPU 16 of the digital television 100 performs processing shown in the flow chart in FIG. 5.

The first CPU 16 switches the "input" to the HDMI terminal to which the digital video camera 200 is connected (step S10). Specifically, the following processing is performed.

The first CPU 16 controls the first and second "input" select switches 3D and 3E so that these select the desired ones of their contacts (of the first to third contacts, those corresponding to the HDMI terminal to which the digital video camera 200 is connected), and controls the video/audio processing portion 21 so that the hot-plug control portion 20 outputs a high-level control signal so as to turn the desired pull-down switch off.

Subsequent to step S10, at step S20, a wait lasts for a predetermined period (for example, about 1.5 to 2 seconds). Thereafter, the first CPU 16 checks whether or not AV data in a TMDS format is being transferred to the switch 9 of the video/audio processing portion 21 (step S30).

If AV data in a TMDS format is being transferred to the switch 9 of the video/audio processing portion 21 ("YES" at step S30), the first CPU 16 judges that the digital video camera 200 is in power-on mode and thus does not transmit a power-on request command.

If AV data in a TMDS format is not being transferred to the switch 9 of the video/audio processing portion 21 ("NO" at step S30), the first CPU 16 judges that the digital video camera 200 is in power-save mode and thus transmits a power-on request command to the digital video camera 200 (step S40). In the embodiment under discussion, it is assumed that the power-on request command is transmitted once or twice.

During the processing at step S10 described above, the HPD signal at the HDMI terminal to which the digital video camera 200 is connected by the HDMI cable 400 may momentarily drop to low level, causing the digital video camera 200 to shift to power-save mode unexpectedly in response to the low-level HPD signal. However, with the digital television 100 embodying the invention, going through the processing at steps S30 through S40 described above permits the digital video camera 200 to return to power-on mode even when it has shifted to power-save mode unexpectedly.

Moreover, with the digital television 100 embodying the invention, setting the timing of the above control properly prevents delay in image presentation.

Generally, HDMI takes about 3 to 4 seconds before image presentation. Before image presentation, first the HPD signal shifts from low level to high level, then HDCP authentication is performed (or may not be performed, depending on the type of source device), then AV data in a TMDS format is outputted, then the signal is confirmed to be stable on the part of the digital television, and only then the image is presented.

With the digital television 100 embodying the invention, when it switches "input," the path is switched to the desired HDMI terminal, that is, the HDMI terminal that is connected to the digital video camera 200 by the HDMI cable 400; then, after a wait of a predetermined period (for example, about 1.5 to 2 seconds), a power-on request command is transmitted to the digital video camera 200. Once an HDMI path is established, the digital video camera 200, even in power-save mode, can make preparations for output of AV data in a TMDS format. Thus, even when the digital video camera 200 is brought to power-on mode after a wait of a predetermined period (for example, about 1.5 to 2 seconds), the image can be presented in a period approximately equal to the period that HDMI typically takes before image presentation.

Moreover, since the digital television 100 embodying the invention is so configured as to transmit a power-on request command after a wait of a predetermined period, if the user switches to another "input" during the wait of a predetermined period, processing for cancellation has only to be done from a stand-by state and thus can be completed in an extremely short period. By contrast, with the conventional configuration, going through an entire procedure for canceling the processing executed after completion of switching of "input" produces a wait of about 1 second.

Figure 6:
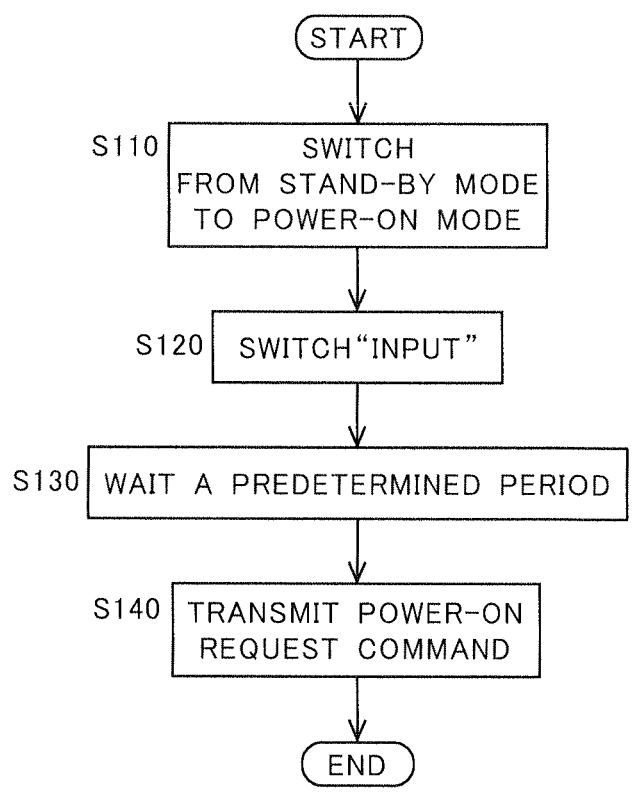
FIG. 6 is a flow chart showing the processing performed when a power-on request command is received from a digital video camera in a digital television embodying the invention.

On receiving a power-on request command from the digital video camera 200, the first CPU 16 of the digital television 100 performs processing according to the flow chart in FIG. 6.

First, the first CPU 16 switches modes from stand-by mode to power-on mode (step S110).

Next, the first CPU 16 switches "input" to the HDMI terminal to which the digital video camera 200 is connected (step S120). The specific processing here is similar to that at step S10 in FIG. 5, and therefore no overlapping description will be repeated.

After completion of switching of "input" at step S120, the first CPU 16 waits a predetermined period (for example, about 1 second) (step S130). Subsequently to step S130, at step S140, the first CPU 16 transmits a power-on request command to the digital video camera 200. In the embodiment under discussion, it is assumed that the power-on request command is transmitted once or twice.

During the processing at step S120 described above, the HPD signal at the HDMI terminal to which the digital video camera 200 is connected by the HDMI cable 400 may momentarily drop to low level, causing the digital video camera 200 to shift to power-save mode unexpectedly in response to the low-level HPD signal. However, with the digital television 100 embodying the invention, going through the processing at step S140 described above permits the digital video camera 200 to return to power-on mode even when it has shifted to power-save mode unexpectedly.

The embodiment described above is merely an example, and many modifications and variations are possible without departing from the spirit of the invention. For example, the digital video camera 200 may be provided with an HDMI terminal so that the digital television 100 and the digital video camera 200 are connected together by the HDMI cable 400 without going through the power supply cradle 300.

A source device is not limited to a digital video camera, and may instead be, for example, a digital still camera. An electronic device according to the invention acting as a sink device is not limited to a digital television, and may instead be, for example, a personal computer.

In the processing in the flow chart shown in FIG. 5, the processing in step S30 may be omitted. On the other hand, in the processing in the flow chart shown in FIG. 6, a step for performing the same processing as at step S30 may be inserted between steps S130 and S140 so that, if AV data in a TMDS format is being transferred to the switch 9 in the video/audio processing portion 21, a power-on request command is not transmitted and, if AV data in a TMDS format is not being transferred to the switch 9 in the video/audio processing portion 21, then, after a wait of a predetermined period, a power-on request command is transmitted to the digital video camera 200.

What is claimed is:
1. An electronic device comprising:
 a plurality of HDMI-connection terminals connectable to an HDMI device that shifts from a normal operation mode to a power-save mode according to an HDMI HPD signal transmitted from an electronic device to which the HDMI device is HDMI-connected;

a selection portion that selects one of the plurality of HDMI-connection terminals for input of audio and/or video data; and a transmission portion that, after switching of input by selection by the selection portion, transmits a particular CEC command requesting a shift to the normal-operation mode to the HDMI device via HDMI upon being triggered by switching of input by selection by the selection portion.

2. The electronic device according to claim 1, wherein the transmission portion transmits the particular CEC command to the HDMI device via HDMI after a wait of a predetermined period after switching of input by selection by the selection portion.

3. The electronic device according to claim 1, further comprising:

a judgment portion that, after switching of input by selection by the selection portion, judges whether or not the HDMI device is in the normal-operation mode, wherein, if the judgment portion judges that the HDMI device is in the normal-operation mode, the transmission portion does not transmit the particular CEC command to the HDMI device via HDMI.

4. The electronic device according to claim 2, further comprising:

a judgment portion that, after switching of input by selection by the selection portion, judges whether or not the HDMI device is in the normal-operation mode, wherein, if the judgment portion judges that the HDMI device is in the normal-operation mode, the transmission portion does not transmit the particular CEC command to the HDMI device via HDMI.

* * * * *